United States Patent [19]

Hanaoka

[11] 4,012,783
[45] Mar. 15, 1977

[54] MAGNETIC HEAD
[75] Inventor: Naohiro Hanaoka, Hachioji, Japan
[73] Assignee: Olympus Optical Co., Ltd., Tokyo, Japan
[22] Filed: Jan. 14, 1976
[21] Appl. No.: 648,919
[30] Foreign Application Priority Data
  Jan. 20, 1975  Japan .................... 50-8573
  Jan. 24, 1975  Japan .................... 50-10291
[52] U.S. Cl. .......................... 360/125; 360/128
[51] Int. Cl.² ................................ G11B 5/12
[58] Field of Search .......... 360/125, 126, 119, 122, 360/128

[56]           References Cited
         UNITED STATES PATENTS
  3,340,518   9/1967   Hanson ................ 360/125
  3,484,565  12/1969   Kronfeld et al. ...... 360/125
  3,495,048   2/1970   Gooch ................. 360/125
  3,684,839   8/1972   Homma ................. 360/125

Primary Examiner—Daryl W. Cook
Attorney, Agent, or Firm—Ostrolenk, Faber, Gerb & Soffen

[57]           ABSTRACT

A magnetic head comprises a pair of core pieces with a spacer interposed therebetween which defines a gap, a yoke which interconnects the ends of the both core pieces located remote from the gap, a bobbin into which the both core pieces and the yoke are fitted to maintain them joined together, and a coil wound around the bobbin. The head is manufactured by the steps of joining together a pair of core pieces with an interposed spacer which defines a gap, applying an adhesive to the mating ends of the both core pieces and the yoke, and fitting the core pieces and the yoke into the bobbin.

4 Claims, 12 Drawing Figures

MAGNETIC HEAD

BACKGROUND OF THE INVENTION

The invention relates to a magnetic head, and more particularly to a magnetic head in which the abutting ends of a pair of core pieces and a yoke which are adhesively secured together are retained in position by a bobbin on which a coil is wound.

Referring to FIG. 1 for a brief description of a conventional monoaural magnetic head, it comprises a pair of core pieces 1, 2, which are joined together with a spacer 3 inteposed therebetween to define a gas $l_0$. A pair of coils 4, 5 are wound on a pair of bobbins 6, 7, which are fitted on a pair of arms 8a, 8b of a yoke 8 which interconnects the opposite ends of the core pieces to complete the magnetic path. End faces 8c, 8d of the arms 8a, 8b of the yoke 8 are polished to a mirror finish as are the end faces 1a, 2a, of the core pieces 1, 2 which are located remote from the gap, and these end faces are applied with an adhesive and brought into abutting engagement against each other, thus adhesively securing the core pieces and the yoke together.

FIG. 2 shows a conventional magnetic head adapted for use with a two channel magnetic tape. Tjhe head includes a pair of core pieces 101, 102 which are joined together with a spacer 103 interposed therebetween to define a gap $l'_0$. A pair of coils 104, 105 are wound on a pair of bobbins 106, 107, which are in turn fitted on a pair of arms 108a, 108b of a yoke 108 which interconnects the both core pieces to complete the magnetic path thereof. The yoke 108 has a pair of end faces 108c, 108d, which are polished to a mirror finish as are end faces 101a, 102a of the core pieces 101, 102 which are located remote from the gap. These end faces are brought into abutting engagement and adhesively secured together to form a monoaural magnetic head 109a. Similarly another monoaural magnetic head 109b is formed, and these heads 109a, 109b are stacked one above the other with a shielding plate 110a interposed therebetween.

In these magnetic heads, the spacer comprises beryllium bronze when the core pieces comprise permalloy, and comprise fused glass where the core pieces comprise ferrite. It will be noted that in FIGS. 1 and 2, the bobins 6, 7 are provided with terminals 9, 10 for the coils 4, 5, and the bobbins 106, 107 are provided with terminals 111a, 111b for the coils 104, 105, respectively.

When adhesively securing the core and the yoke together, the use of a so-called flash adhesive will achieve a high efficiency, but may frequently result in a poor adhesion. While adhesives such as epoxy resin which becomes hardened on heating may be used, there remains the possibility of a burn-out of the coils. To avoid these difficulties, an aged hardening of adhesives such as epoxy resis has been frequently employed. However, in this instance, the portions of the core and the yoke which are to be bonded together must be maintained in abutment against each other and prevented against unintended movement by means of some retaining members for a period of 12 hours or longer until the hardening is complete. Such a retaining member generally has an increased size, and since one retaining member is required for each monaural head, its use presented problems in the manufacturing in terms of the cost and space requirement. Since the core and the yoke cannot be moved during the process of hardening, they cannot be carried into the next step, so that the aged hardening does not lend itself to a mass production.

SUMMARY OF THE INVENTION

It is an object of the invention to provide a monoaural or multi-channel magnetic head which can be manufactured easily on a mass production basis without requiring the use of special retaining members, by an arrangement including a coil bobbin into which portions of a pair of core pieces having a gap defined therebetween as well as end portions of a yoke are fitted and maintained in abutment against each other.

A monoaural magnetic head according to the invention includes a bobbin which is formed with a pair of jaws, which maintain both the core pieces and the yoke in abutment against each other during the process of an aged hardening of an adhesive used.

When a multi-channel magnetic head is to be manufactured according to the invention, a pair of core pieces and a yoke have their portions which are to be bonded together applied with an adhesive, and are brought into abutting engagement against each other, and then a shielding plate is laid over them. Another sub-assembly comprising a pair of core pieces and a yoke is disposed over the first mentioned sub-assembly and overlaid with another shielding plate. Any additional sub-assembly which is required to complete the multi-channel head is sequentially disposed one above another in this manner to form a stack, which is placed between a pair of abutment members integrally formed with a coil bobbin and which are resiliently urged by a spring. In this manner, an aged hardening of the adhesive is achieved without requiring the use of the special retaining members. As a result, a mass production of high quality magnetic heads is enabled at a reduced cost.

DETAILED DESCRIPTION OF PREFERRED EMBODIMENTS

Figure 1:
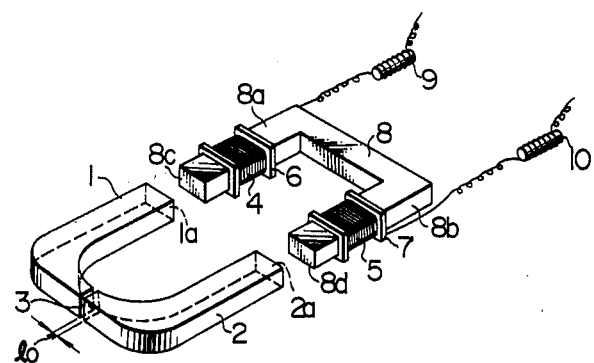
FIGS. 1 and 2 are exploded, perspective views of conventional magnetic heads.
Figure 2:
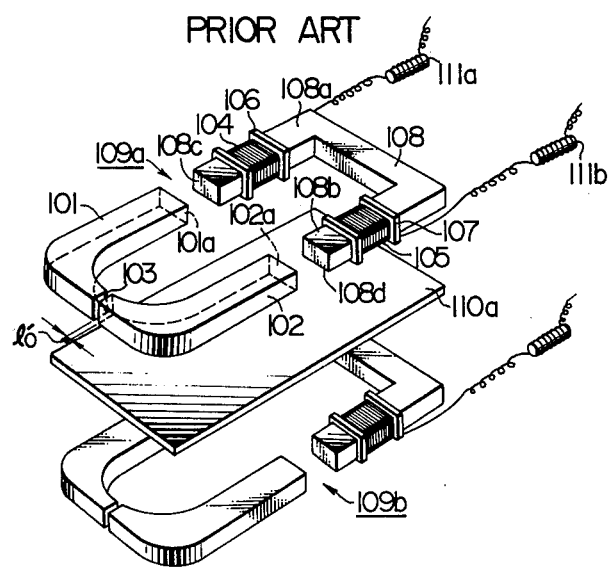
Figure 3:
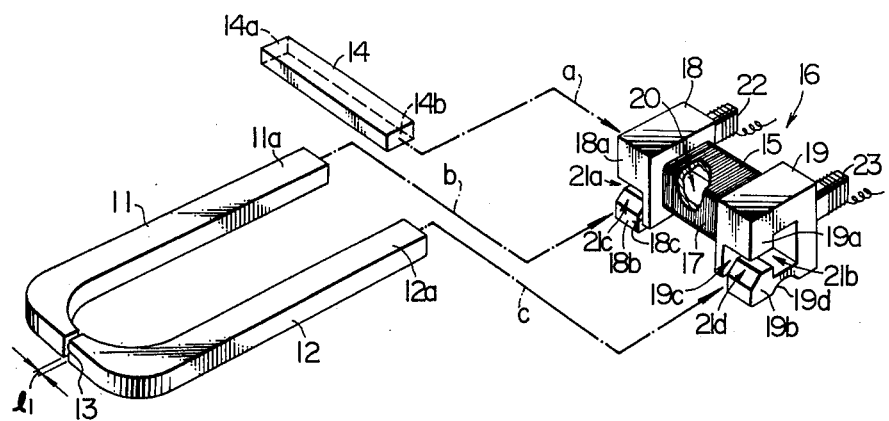
FIG. 3 is an exploded perspective view of the magnetic head constructed according to one embodiment of the invention.

Referring to FIG. 3, there is shown a monoaural magnetic head constructed in accordance with the invention. In this Figure, a pair of core pieces 11, 12 are joined together at their one end, with a spacer 13 interposed therebetween, thus defining a gap $l_1$. Alternatively, the pair of core pieces may be bonded by fused glass. At the end remote from the gap, the upper surfaces 11a, 12a of the core pieces 11, 12 are associated with a bar-shaped yoke 14. The upper surfaces 11a, 12a of the core pieces and the lower surfaces 14a, 14b of the yoke 14 adjacent to its opposite ends are polished to a mirror finish. Before being bonded with the core pieces 11, 12, the yoke 14 is fitted into a bobbin 16 on which a coil 15 is wound. The bobbin 16 includes a body 17 on which the coil 15 is disposed, and a pair of integral flanges 18, 19 located on the opposite sides of the body 17, and a bore 20 is formed therein to extend through the body 17 and the flanges 18, 19 so as to receive the yoke 14, as indicated by cutting away the body 17.

Figure 4:
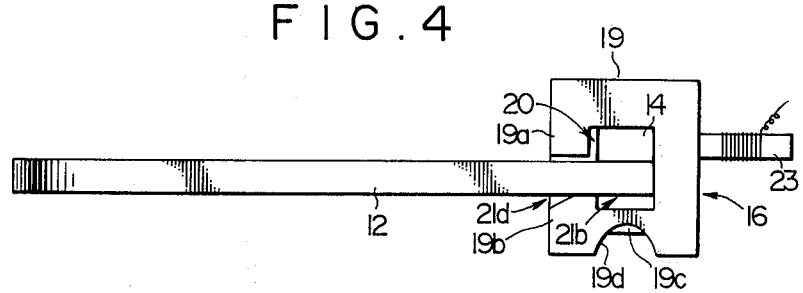
FIG. 4 is a side elevation of the head shown in FIG. 3 when it is completely assembled.
Figure 5:
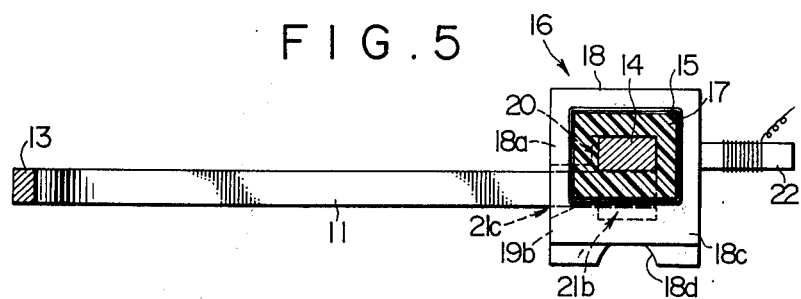
FIG. 5 is a schematic cross section of the head shown in FIG. 4.
Figure 6:
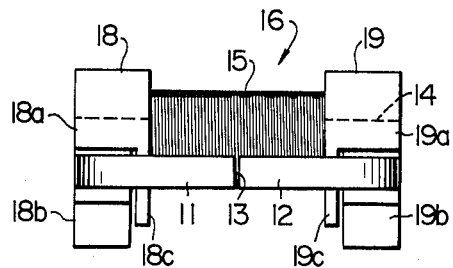
FIG. 6 is a front view of the magnetic head shown in FIG. 4.
Figure 7:
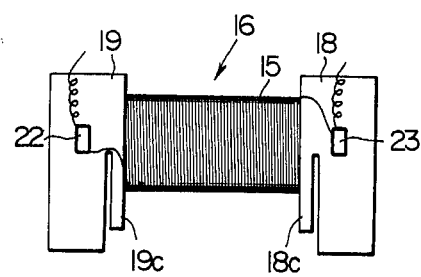
FIG. 7 is a rear view of the magnetic head shown in FIG. 4.

On the outer side, the both flanges 18, 19 are formed with a pair of outwardly open notches 21a, 21b which communicate with the bore 20 at their lower end, and which are formed with a pair of core receiving openings 21c, 21d, respectively. These openings 21c, 21d form a pair of upper and lower jaws 18a, 18b and 19a, 19b which are integral with the flanges 18, 19, respectively. At a position inward of the notches 21a, 21b, the respective flanges are formed with a pair of guide walls 18c, 19c (see FIG. 7), which are separate from the lower jaws 18b, 19b by a notch formed therebetween, the guide walls depending downwardly. In this manner, the free end of the lower jaws 18b, 19b can be elastically moved relative to the remainder of the respective flanges 18, 19. To increase the elasticity of the lower jaws 18b, 19b, their lower portion is partially cut off as shown at 18d, 19d (see FIGS. 4 and 5).

To assemble the magnetic head, the lower surfaces 14a, 14b of the yoke 14 is applied with an adhesive such as epoxy resin adhesive, for example, adjacent to its opposite ends, and then the yoke inserted into the bore 20 of the bobbin 16 in the direction of an arrow a (see FIG. 3). Then the core pieces 11, 12 which are joined together to define the gap is applied with an adhesive on their upper surfaces 11a. 12a adjacent to their free end, and is passed into the notches 21a, 21b through the openings 21c, 21d, as shown by arrows b and c (see FIG. 3) while utilizing the guide walls 18c, 19C. When the yoke 14 and the joined core pieces 11, 12 are fitted into the bobbin 16, the lower surfaces 14a, 14b of the yoke 14 adjacent to its opposite ends are brought into contact with the upper surfaces 11a, 12a of the core pieces 11, 12 adjacent to their free end, with a layer of adhesive interposed therebetween, and these portions of the core pieces and the yoke which are to be bonded together are maintaiened in abutment against each other by the cooperation of the top of the flanges 18, 19 with their lower jaws 18b, 19b, thus allowing and facilitating a favorable aged hardening of the adhesive without requiring any special retaining members.

It will be noted that the both flanges 18, 19 of the bobbin 16 is provided with a pair of electrical terminals 22, 23 on their rear side for connecting the coils with an external source of current. It will be noted that the bobbin 16 may be integrally molded in plastic material with the terminals 22, 23 embedded therein, but various parts may be separately molded and later assembled together, the sole requirement being that the core pieces and the yoke can be maintained in abutment against each other by the retaining portion of the bobbin.

Figure 8:
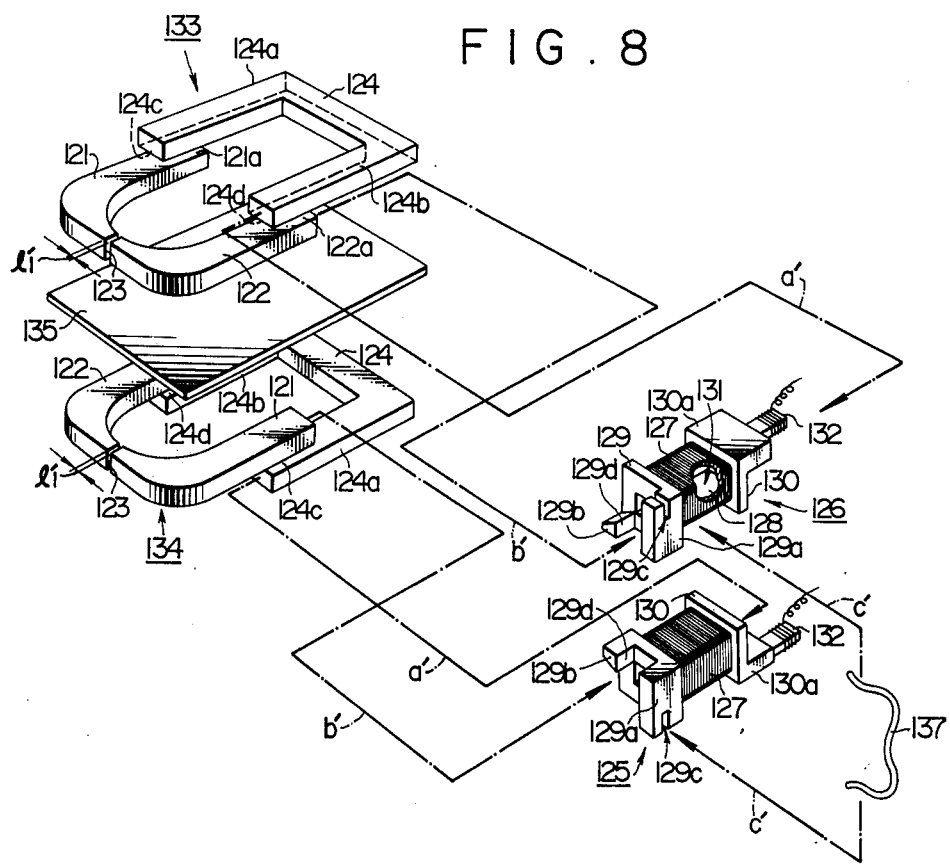
FIG. 8 is an exploded perspective view of the magnetic head constructed in accordance with another embodiment of the invention.
Figure 11:
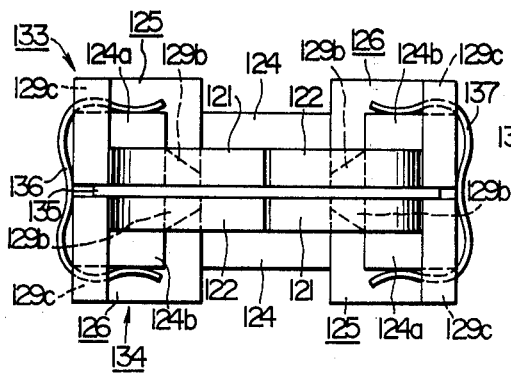
FIG. 11 is a front view of the magnetic head shown in FIG. 9.
Figure 12:
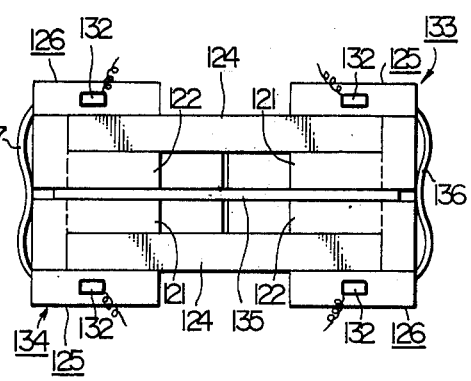
FIG. 12 is a rear view of the magnetic head shown in FIG. 9.

Another form of monaural magnetic head constructed according to the invention and a two channel magnetic head which utilizes such a monaural head will be described with reference to FIG. 8. Referring to FIG. 8, a pair of core pieces 121, 122 are joined together at their one end with a spacer 123 interposed therebetween or are joined together by fused glass, thereby defining a gap $l'_1$. Adjacent to the opposite end, the upper surfaces of the core pieces 121, 122 are polished to a mirror finish to provide portions 121a, 122a which are to be bonded with a yoke 124. The yoke 124 includes a pair of arms 124a, 124b, the lower surface of which is polished, adjacent to their free end, to a mirror finish just as the core pieces 121, 122 are polished, thereby providing yoke portions 124c, 124d which are to be bonded with the core pieces. As shown in FIG. 11, a pair of bobbins 125, 126 are mounted on the arms 124a, 124b of the yoke 124. These bobbins 125, 126 are constructed in a configuration symmetrical with respect to a vertical plane which extends through the gap $l'_1$ and parallel to the respective arms of the yoke. One of the bobbins, 126, is more fully shown in FIG. 8. Specifically, referring to FIG. 8, the bobbin 126 includes a body 128 on which a coil 127 is wound, and a pair of integral flanges 129, 130 which are located on the opposite sides of the body 128. A bore 131 extends through the body and the flanges, as shown by partially cutting away the body 128 in FIG. 8. The front flange 129 of the bobbin 126 is integrally formed with a projecting wall 129a on the right-hand side and a projecting guide 129b on the left-hand side. The top of the wall 129a is formed with a groove 129c which is adapted to engage a retention spring to be described later. The groove 129c may be formed as a notch or a hole, provided the end of the retention spring 137 (to be described later) can be passed into the hole. The guide 129b has a right-hand wall 129d which is located flush with the left-hand sidewall of the bore 131, and serves to position the free end of the core piece 122, as it is inserted into the space between the wall 129a and the guide 129b, into alignment with the portion 124d of the arm 124b of the yoke 124 which is inserted into such space from the opposite direction. The rear flange 130 of the bobbin 126 is formed with a top extension 130a carrying a terminal 132 for the coil 127.

The arm 124b of the yoke 124 is inserted into the bore 131 from the rear end of the bobbin 126, as indicated by an arrow a' shown in FIG. 8, after applying an epoxy resin adhesive to the portion 124d thereof. A similar adhesive is applied to the portion 122a of the core piece 122, and is inserted into the bobbin 126 from the front end thereof, as shown by an arrow b' in FIG. 8, so that it is located directly below the arm 124b of the yoke 124, thus bringing the both portions 124d, 122a into contact with each other.

The arm 124a of the yoke 124 is similarly fitted with the bobbin 125 (see FIG. 11) having a configuration symmetrical to the bobbin 126 with respect to the median vertical plane, and the core piece 121 is similarly fitted into the bobbin 125 as the core piece 122 is fitted into the bobbin 126. When the bobbins 125, 126 are assembled with the yoke 124, and the latter bonded with the core pieces 121, 122 which are joined to define the gap therebetween, there is obtained a monaural magnetic head 133.

There is provided another monoaural magnetic head 134 which is similar in construction to the magnetic head 133 mentioned above. The monoaural head 134 has a configuration which is obtained by turning the head 133 upside down, and corresponding parts are designated by like numerals as before. As a consequence, it is only necessary to provide two kinds of bobbins 125, 126 which are symmetrical to the median vertical plane mentioned above. It is also possible to use a single kind of bobbin throughout, by providing a pair of grooves 129c in the top and bottom of the wall 129a, and providing a pair of vertically spaced guides 129b along the left-hand side of the flange 129. While the bobbin 125 is not identical in configuration to the bobbin 126, its parts are designated by numerals which are used to designate the corresponding parts of the bobbin 126.

Figure 9:
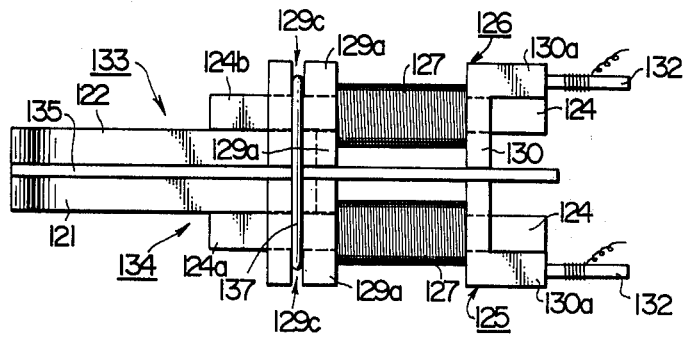
FIG. 9 is a side elevation of the magnetic head shown in FIG. 8 when it is completely assembled.
Figure 10:
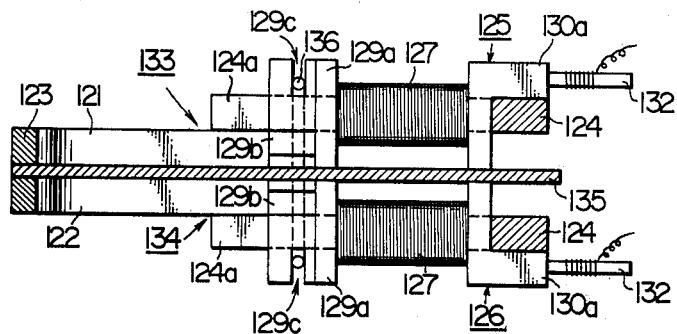
FIG. 10 is a cross section of the magnetic head shown in FIG. 9.

The pair of monoaural magnetic heads 133, 134 thus constructed are disposed one above another to form a stack with a shielding plate 135 of a material such as aluminum interposed therebetween, and an adhesive may be applied thereto as desired. A pair of channel-shaped retention springs 136, 137 (see FIG. 11) have their limbs engaged with the upper and lower grooves 129c in the bobbins 125, 126, as shown by an arrow c' in FIG. 8, so that they bear against the arms 124a, 124b of the yokes 124 from above and below, respectively. In this manner, the stack comprising the core pieces 121, 122, the yokes 124 and the shielding plate 135 are resiliently held together by the pair of retention springs 136, 137. As a result, the portions 121a, 122a of the core pieces 121, 122 are held in abutment against the portions 124c, 124d of the yokes 124 as are the monoaural magnetic heads 133, 134 against the shielding plate 135, allowing a favorable aged hardening of the adhesive or adhesives used throughout the stack while their parts are maintained under proper abutting relationship (see FIGS. 9 and 10). The retention springs 136, 137 may be left in position or removed after the adhesive has become hardened. By disposing a plurality of such monoaural magnetic heads one above another with additional shielding plates interposed therebetween to form a stack, there can be formed a multichannel magnetic head. In this instance, the retention springs will be engaged across the uppermost and the lowermost bobbins.

It should be understood that the configuration, design and construction of the core pieces, yoke and bobbins can be modified without departing for the scope of the present invention.

What is claimed is:

1. A magnetic head comprising a pair of core pieces having a spacer interposed therebetween to define a gap, a yoke interconnecting the ends of the core pieces which are remote from the gap, a bobbin having a pair of flanges at its opposite ends which are adapted to maintain portions of the core pieces and the yoke which are to be bonded together in abutting engagement when they are engaged with the flanges, and a coil disposed on the bobbin intermediate the flanges.

2. A magnetic head according to claim 1 in which the bobbin is formed with a bore for receiving the yoke which extends through the length of the bobbin and the both flanges, each of the flanges being formed with a notch which defines a core piece receiving opening and a pair of jaws located on the opposite sides of the opening for holding the core piece therebetween.

3. A magnetic head comprising a pair of core pieces having a spacer interposed therebetween to define a gap, a yoke having a pair of arms which interconnect the ends of the core pieces located remote from the gap, a pair of bobbins each having a pair of flanges at its opposite ends, the flanges being adapted to maintain portions of the core pieces and the both arms of the yoke which are to be bonded together in abutting engagement when they are fitted into the flanges, and a pair of coils disposed on the respective bobbins intermediate the pair of flanges associated therewith.

4. A multi-channel magnetic head comprising a plurality of magnetic head sub-assemblies, each of the magnetic head sub-assemblies comprising a pair of core pieces having a spacer interposed therebetween to define a gap, a yoke including a pair of arms which interconnect the ends of the both core pieces located remote from the gap, a pair of bobbins each having a pair of flanges at its opposite ends, the flanges being adapted to maintain portions of the both core pieces and the both arms of the yoke which are to be bonded together in abutting engagement with each other when they are fitted into the flanges, a coil disposed on the both bobbins intermediate the pair of flanges associated therewith, and detent means formed in one of the flanges of the respective bobbins, the plurality of magnetic head sub-assemblies being disposed one above another to form a stack; at least one insulating plate interposed between adjacent magnetic head sub-assemblies; and retention spring means engaged with the detent means formed in those bobbins which are located at the opposite ends of the stack for maintaining the magnetic head sub-assemblies of the stack in abutting engagement with each other.

* * * * *